United States Patent [19]
Grgich et al.

[11] Patent Number: 5,632,802
[45] Date of Patent: May 27, 1997

[54] APPARATUS AND METHOD OF REGENERATING ADSORBERS FOR DRYING AIR

[76] Inventors: George R. Grgich, 208 Loft La., Raleigh, N.C. 27609; Michael S. Cranford, 5228 Deer Chase Trail, Wake Forest, N.C. 27587; John C. Patton, 5140 Carmel Club Dr., Charlotte, N.C. 28226

[21] Appl. No.: 398,646

[22] Filed: Mar. 3, 1995

[51] Int. Cl.[6] .................................... B01D 53/04
[52] U.S. Cl. .................. 95/10; 95/11; 95/14; 95/18; 95/123; 95/126; 95/148; 96/111; 96/112; 96/115; 96/130; 96/133; 96/142
[58] Field of Search .................. 95/10, 11, 14, 95/17, 18, 21, 117–126, 148; 96/111–116, 121, 126–128, 130, 133, 146, 142

[56] References Cited

U.S. PATENT DOCUMENTS

| | | | |
|---|---|---|---|
| 2,089,776 | 8/1937 | Wittmann | 96/128 X |
| 2,214,737 | 9/1940 | Dauphinee | 96/133 |
| 2,303,333 | 12/1942 | Dauphinee | 96/133 |
| 2,535,902 | 12/1950 | Dailey, Jr. | 95/124 |
| 2,588,296 | 3/1952 | Russell, Jr. | 96/128 X |
| 2,624,421 | 1/1953 | Savage | 183/4.3 |
| 2,633,928 | 4/1953 | Chamberlain | 96/111 |
| 2,640,558 | 6/1953 | Dauphinee | 96/133 |
| 2,699,837 | 1/1955 | Van Note | 96/127 |
| 2,712,981 | 7/1955 | Beggs | 95/124 X |

(List continued on next page.)

FOREIGN PATENT DOCUMENTS

| | | |
|---|---|---|
| 483283 | 5/1952 | Canada . |
| 2126649 | 11/1972 | Germany . |
| 2602582 | 10/1977 | Germany . |
| 55-079027 | 6/1980 | Japan .................. 96/127 |
| 56-152726 | 11/1981 | Japan .................. 96/112 |
| 1551817 | 6/1988 | U.S.S.R. . |
| 1581357 | 7/1990 | U.S.S.R. .................. 96/130 |
| 146397 | 6/1921 | United Kingdom . |
| 2142254 | 1/1985 | United Kingdom .................. 96/112 |
| 2199513 | 7/1988 | United Kingdom . |

OTHER PUBLICATIONS

A pamplet by Atlantic Research Corporation; "Desiccant Type Desomatic Adsorption Dryers for Compressed Air, Gases, Liquids, and Process Streams;" Sep., 1967.
A pamphlet by Ingersoll–Rand; "Thermal Mass Air Dryers for Desert Dry Compressed Air;" May, 1972.
A pamphlet by Bry–Air; "MVB Engineering and Application Data Manual;" Mar., 1995.
Brink et al., "Mist Removal From Compressed Gases". Chemical Engineering Progress, vol. 62, No. 4, pp. 60–65 (1966).
A pamphlet by Gas Drying, Inc.; "GDI Blower Purge Dryers;" Jan., 1992.
A pamphlet by Gas Drying, Inc.; "Compressed Air Desiccant Dryer;" Oct., 1989.
A pamphlet by Gas Drying, Inc.; "Twin Tower Externally Heated Desiccant Air Dryers;" May, 1991.
A pamphlet by Pneumatech, Inc.; "The Preferred Technology for Economy Regenerative Air/Gas Dryers;" Bulletin A–10EE, Section 20–2.

(List continued on next page.)

*Primary Examiner*—Robert Spitzer
*Attorney, Agent, or Firm*—Ralph H. Dougherty; Christopher C. Dremann

[57] ABSTRACT

An improved method and apparatus for removing moisture from compressed air through a pre-compression adsorptive desiccant bed, heat reactivated and regenerative air drying and filtration system. This system consists of an air filter affixed to a blower and in communication with a heater connected and communicating with a conduit communicating with a first valve and a second valve. The first and second valve are each connected to another conduit which is connected to a desiccant bed adsorption unit and another valve and conduit which is in communication with an air compression machine. Each desiccant bed is preferably of tubular configuration.

53 Claims, 9 Drawing Sheets

U.S. PATENT DOCUMENTS

| | | | |
|---|---|---|---|
| 2,783,547 | 3/1957 | Bieger et al. | 96/116 X |
| 3,016,978 | 1/1962 | Hull | 96/113 |
| 3,034,315 | 5/1962 | Coblentz | 62/272 |
| 3,091,098 | 5/1963 | Friant | 62/85 |
| 3,193,985 | 7/1965 | Siggelin | 95/125 |
| 3,204,388 | 9/1965 | Asker | 96/111 X |
| 3,226,948 | 1/1966 | Alderson et al. | 62/317 |
| 3,236,028 | 2/1966 | Rutan | 55/33 |
| 3,319,347 | 5/1967 | Bentley | 34/32 |
| 3,643,402 | 2/1972 | Wireman | 96/111 X |
| 3,850,598 | 11/1974 | Boehm | 96/146 X |
| 3,880,616 | 4/1975 | Myers et al. | 96/128 X |
| 4,237,696 | 12/1980 | Coblentz | 62/93 |
| 4,364,756 | 12/1982 | Clarke et al. | 55/316 |
| 4,474,661 | 10/1984 | Nearpass et al. | 210/437 |
| 4,721,515 | 1/1988 | Hata et al. | 55/162 |
| 4,775,484 | 10/1988 | Schmidt et al. | 210/673 |
| 4,806,134 | 2/1989 | Lhota | 55/162 |
| 4,812,148 | 3/1989 | Hata et al. | 55/162 |
| 4,863,497 | 9/1989 | Grenier et al. | 55/181 |
| 5,037,458 | 8/1991 | Trepaud | 55/162 |
| 5,169,413 | 12/1992 | Leavitt | 55/25 |
| 5,335,426 | 8/1994 | Settlemyer et al. | 34/80 |
| 5,378,266 | 1/1995 | Elamin | 96/114 |

OTHER PUBLICATIONS

A pamphlet by Zurn Industries, Inc.; "Hydryer Type P Heat Regenerative Dryers;" Form No. 310–SBG; Nov., 1991.

A pamphlet by Zurn Industries, Inc.; "PSC Heaterless Dryers;" Form No. 303–SBG; Nov., 1990.

A pamphlet by Zurn Industries, Inc.; "Heaterless Regenerative Type Compressed Air Dryers;" Form GHL; Dec., 1986.

A pamphlet by Zurn Industries, Inc.; "Gas and Liquid Dehydration and Purification Systems;" Form No. 401–SBG; Sep., 1990.

A pamphlet by PSB Armour, Inc.; "PSM and PSL Heaterless Dryer;" Form No. 310–SBG; Jan., 1994.

A pamphlet by Zeks Air Dryer Corporation; "Hydronix Heat Reactived Desiccant Dryers;" Form No. HRD–0893–10M–JRL; 1993.

A pamphlet by Zeks Air Dryer Corporation; "Hydronix Heatless Desiccant Dryers;" Form No. HPS–1094–10M–JRL; 1994.

APPARATUS AND METHOD OF REGENERATING ADSORBERS FOR DRYING AIR

FIELD OF THE INVENTION

The present invention relates to apparatus and method for regenerating adsorbers for drying gas prior to its compression in a compressed gas system.

BACKGROUND OF THE INVENTION

In current compressed air systems, compressed air drying equipment is required to remove moisture from the air to improve the quality of the air before it is used by equipment or machinery that requires compressed air to operate. Because of limitations of current designs, compressed air is dried on the pressurized side of the compressor, as it has not been economical or energy efficient to dry the air at atmospheric pressure before it is compressed.

DESCRIPTION OF RELATED ART

Applicant is aware of the following U.S. Patents concerning methods and apparatus for drying air for use with a compressor.

| U.S. Pat. No. | Issue Date | Inventor | Title |
| --- | --- | --- | --- |
| 4,474,661 | 10-02-1984 | Nearpass | FILTER DRYER |
| 4,775,484 | 10-04-1988 | Schmidt | METHOD AND APPARATUS FOR THE CONTINUOUS SEPARATION OF CONTAMINANTS FROM A FLUID MIXTURE |
| 4,863,497 | 09-05-1989 | Grenier | OZONE-PRODUCING PLANT |
| 5,037,458 | 08-06-1991 | Trepaud | APPARATUS FOR REGENERATING AN ADSORBER IN A GAS DRYING PLANT |
| 5,169,413 | 12-08-1992 | Leavitt | LOW TEMPERATURE PRESSURE SWING ADSORPTION WITH REFRIGERATION |
| 5,335,426 | 08-09-1994 | Settlemyer | METHOD AND APPARATUS FOR THERMAL REGENERATION OF MOLECULAR SIEVE MATERIAL USED IN OXYGEN CONCENTRATIONS |
| 5,378,266 | 01-03-1995 | Elamin | AIR DRYER SYSTEM |

Nearpass U.S. Pat. No. 4,474,661 teaches a filter dryer for refrigeration systems which include a generally tubular molded desiccant core therein. The central opening of the core is sealed and one end thereof supported by a forced-in plastic ball which itself is retained in a seat dimpled in the inlet baffle.

Schmidt U.S. Pat. No. 4,775,484 teaches a method and apparatus for the separation of components combined in a fluid mixture. See FIGS. 7, 8, and 9 which shows radial-flow chambers used and regenerated sequentially by means of a carousel support.

Grenier U.S. Pat. No. 4,486,497 teaches an ozone-producing apparatus in which oxygen circulating in an ionization loop is partly ozonized in an ozonizer and then the ozone is trapped by adsorption and desorbed by a substitution gas. Grenier's plural radial-flow desiccant beds are sequentially used and regenerated by selective feed thereto. Note blower 2 and heat exchanger 8 preceding the selective input, as in one depiction of the present invention.

Trepaud U.S. Pat. No. 5,037,458 teaches a method of regeneration adsorbers in a gas drying plant, notably a plant for drying compressed air, and apparatus for carrying them out. This system uses two adsorbers so that one adsorber performs the adsorbing function while the other is regenerating.

Leavitt U.S. Pat. No. 5,169,413 teaches pressure swing absorption gas separation operations enhanced by the retention and use of internal refrigeration effects, without the need for externally supplied refrigeration. Leavitt's adsorber beds are fed selectively and the flow through the beds may be radial (see column 9, line 48).

Settlemyer U.S. Pat. No. 5,335,426 teaches a method and apparatus for regenerating molecular sieve material using a combination of heat and dry sweep gas. This system also employs two drying chambers containing a desiccant material. The active drying chamber removes moisture while the inactive chamber sends a sweep gas through the desiccant material to remove moisture.

Elamin U.S. Pat. No. 5,378,266 teaches a system in which a separate purge volume intermittently purges the desiccant when the compressor goes off load. In the alternative, the purge volume is replaced by a second desiccant cartridge and the two desiccant cartridges are alternatively purged and used to dry the compressed air.

SUMMARY OF THE INVENTION

The purpose of the present invention is to dry the air at atmospheric pressure before it enters an air compressing machine. By efficiently drying the air at this point, energy consuming components downstream of the compression stages are eliminated. Also by lowering the dewpoint of the air before compression, the compressor produces air at dewpoints which meet or exceed the capabilities of current compressed air drying equipment.

The components which can be eliminated and thus save energy and equipment cost are as follows: aftercoolers, moisture separators, compressed air dryers and oil/water separators. Aftercoolers, moisture separators and air dryers create pressure drops in a compressed air system. These pressure drops require energy to overcome losses. With this invention, the energy required to overcome these losses is saved. Air cooled aftercoolers and air dryers consume electric energy in order to operate. This is another area of energy savings that can be experienced with this invention. Air compressors are more efficient when the compressing air is dry. This benefit can also be added to the energy savings total that this invention creates.

Environmental benefits are also realized from the use of this invention. Refrigerated type compressed air dryers use chlorofluorocarbon refrigerants which are damaging to the earth's ozone layer. The invented apparatus does not require any type of refrigerants to operate. Moisture separators and refrigerated air dryers produce condensate which is contaminated with compressor oil when an oil lubricated air compressor is used. If this condensate is not eliminated properly or if an oil/water separator is not used to scrub the condensate of oil, the condensate can contaminate the earth and groundwater supplies. Also, the condensate can produce a burden on wastewater treatment facilities if the condensate is introduced into a sewage system. In the present invention, since the air is dry when it leaves the compressor, no condensate is formed.

Air cooled compressed air drying equipment is dependent on cool ambient conditions, typically less than 100° F. or 37.8° C. to operate properly. These conditions have no bearing on the performance of this invention.

This invention eliminates the components operating under pressure and any danger that exists by their rupturing under pressure due to corrosion of pressure vessels or malfunctioning pressure relieving devices.

OBJECTS OF THE INVENTION

The principal object of the present invention is to provide an improved method of drying atmospheric air before it enters into an air compressing machine.

A further object of this invention is to provide a method of drying atmospheric air which has no need for aftercoolers, moisture separators, compressed air dryers and oil/water separators.

Another object of the invention is to provide an apparatus for lowering the dewpoint of atmospheric air so that, after compression, the dewpoint of the air meets or exceeds the drying capabilities of current compressed air drying systems.

Another object of the invention is to provide apparatus which eliminates the pressure drops that occur in present compressed air drying systems.

Another object of the invention is to provide energy-efficient gas drying apparatus that reduces capital costs of associated compressed air drying equipment.

Another object of this invention is to provide gas-drying apparatus that increases the efficiency of an associated gas compressor, which translates into further energy savings.

Another object of the invention is to provide gas-drying apparatus that eliminates the potential for moisture condensation in the oil of lubricated gas compressors, which increases the life of the compressor and reduces the cost of maintenance.

Another object of the invention is to provide desiccant bed apparatus that does not require a pressure vessel.

Another object of the invention is to provide air drying apparatus which eliminates the need for a refrigerated compressed air dryer, which also eliminates the presence of chlorofluorocarbon refrigerants which damage the earth's ozone layer.

BRIEF DESCRIPTION OF THE DRAWINGS

The foregoing and other objects will become more readily apparent by referring to the following detailed description and the appended drawings in which.

DETAILED DESCRIPTION

Figure 1:
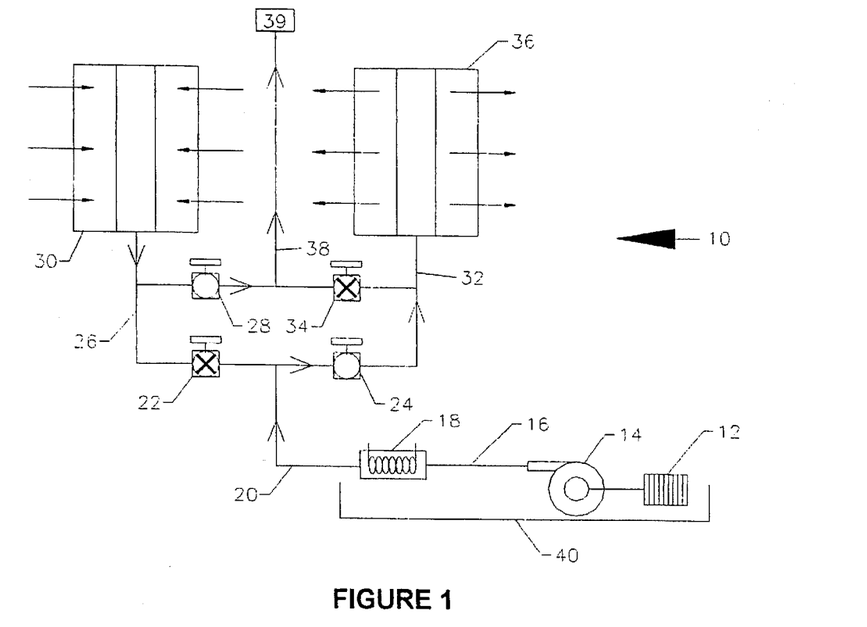
FIG. 1 is a schematic diagram of the present invention.
Figure 1A:
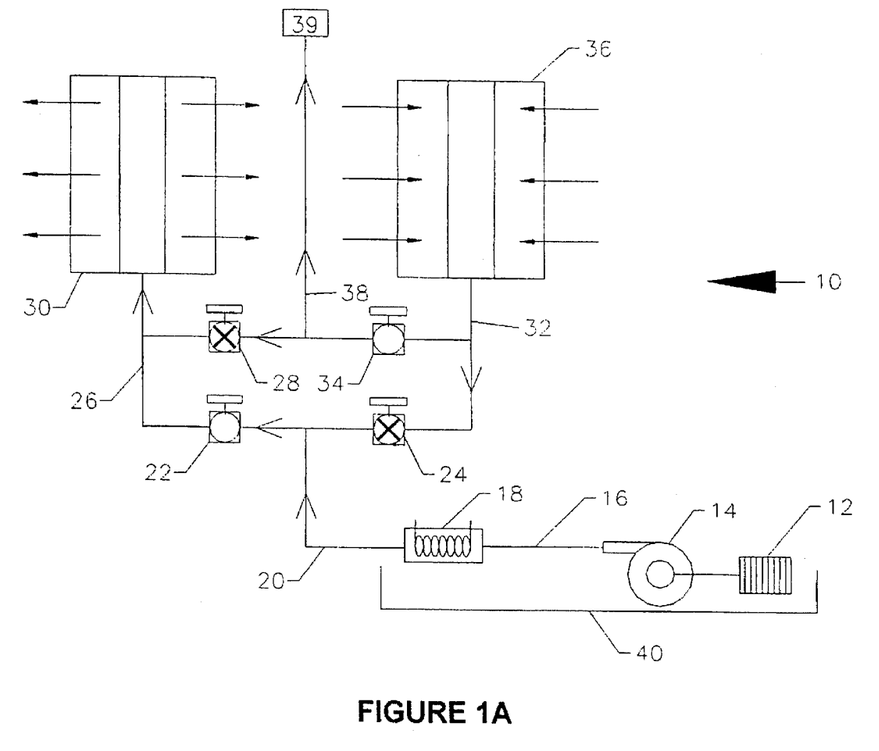
FIG. 1a is a schematic diagram of the present invention showing the reverse regeneration from FIG. 1.

Referring now to the drawings, a pre-compression dehydration system 10, shown in FIG. 1, includes an air filter 12, which filters incoming air to blower 14. A first conduit 16 is coupled between the blower 14 and a heater 18 which is coupled to a second conduit 20. This second conduit 20 is fitted with a first valve 22 and a second valve 24. A third conduit 26 is coupled to and in communication with the first valve 22, a third valve 28 and a first desiccant bed absorption unit 30. The fourth conduit 32 is coupled and in communication with the second valve 24, a fourth valve 34, and a second desiccant bed absorption unit 36. A fifth conduit 38 is coupled to and in communication with the third valve 28, the fourth valve 34, and a gas compression machine 39, such as an air compressor.

Figure 3:
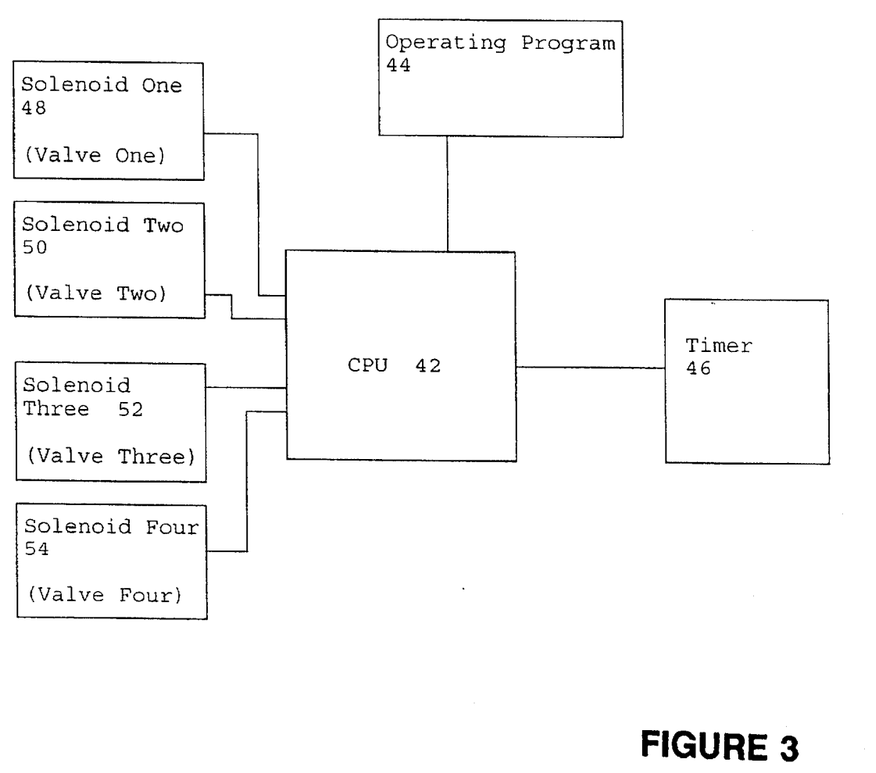
FIG. 3 is a block diagram of an automatic control for the system.

This system, the operation of which can be fully automatic, incorporates two adsorber beds 30 and 36, along with a heated regenerating system 40. This automatic system comprises a central processing unit (hereinafter CPU) 42, FIG. 3, which is controlled by an operating program 44. The operating program 44 is based on the physical characteristics of the desiccant bed which has physical characteristics for adsorption and regeneration. A timer 46 and solenoids 48, 50, 52, 54 are connected to the CPU 42, which operate the first, second, third and fourth valves, 22, 24, 28, 34. In response to control signals from CPU as shown in FIG. 1, one desiccant adsorber bed 30 dries the air from an outside-to-inside flow direction of ambient air from outside the heat regenerating system 40. Operating program 44 sends a signal to the CPU 42 to close the first valve 22 via solenoid 48, and to open the third valve 28 via solenoid 52. The second desiccant adsorber bed 36 is regenerating from an inside to outside flow direction of warm or hot air from the heat regeneration system 40. Operating program 44 sends a signal to the CPU 42 to close the fourth valve 34 via solenoid 54, and open the second valve 24 via solenoid 50.

Figure 4:
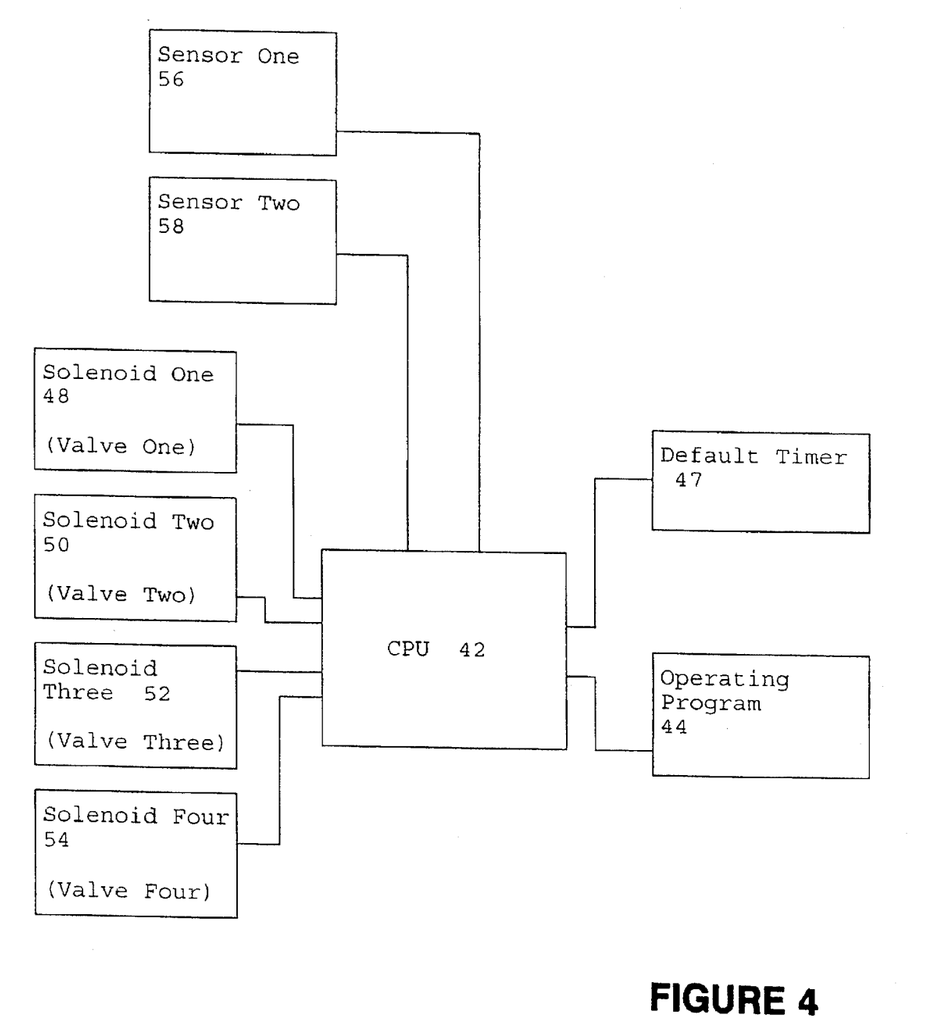
FIG. 4 is a block diagram of an alternative embodiment of an automatic control for the system.
Figure 9:
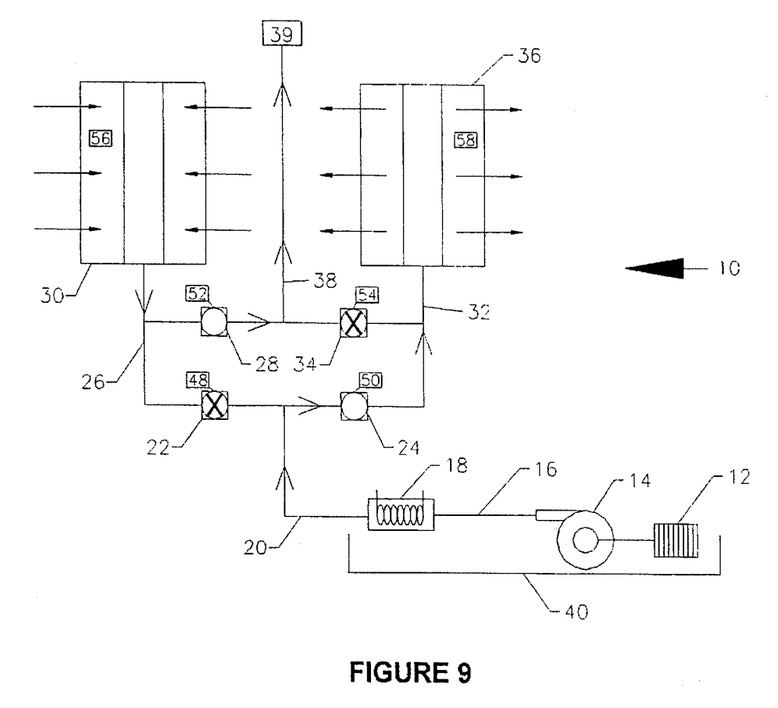
FIG. 9 is a schematic diagram of the present invention using electronic controls.
Figure 9A:
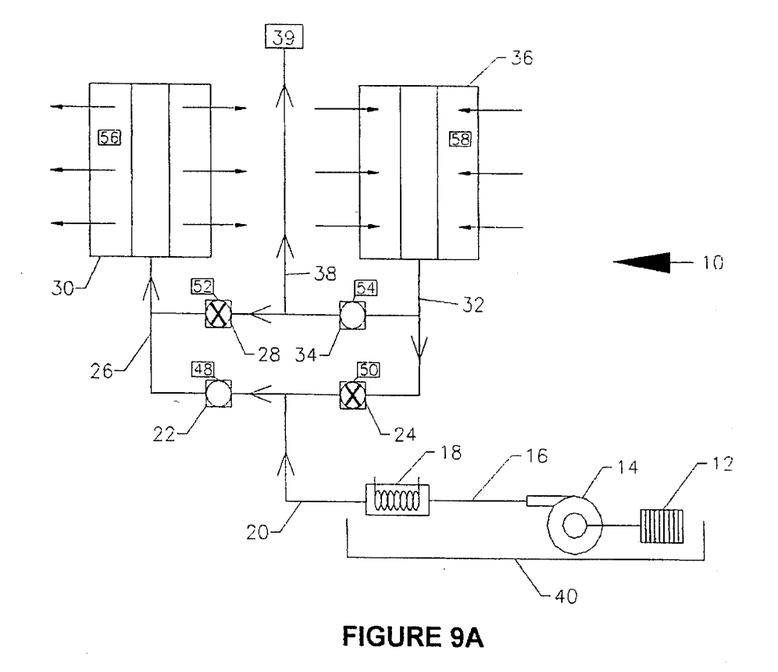
FIG. 9a is a schematic diagram of the present invention with electronic controls showing the reverse regeneration from FIG. 9.
Figure 10:
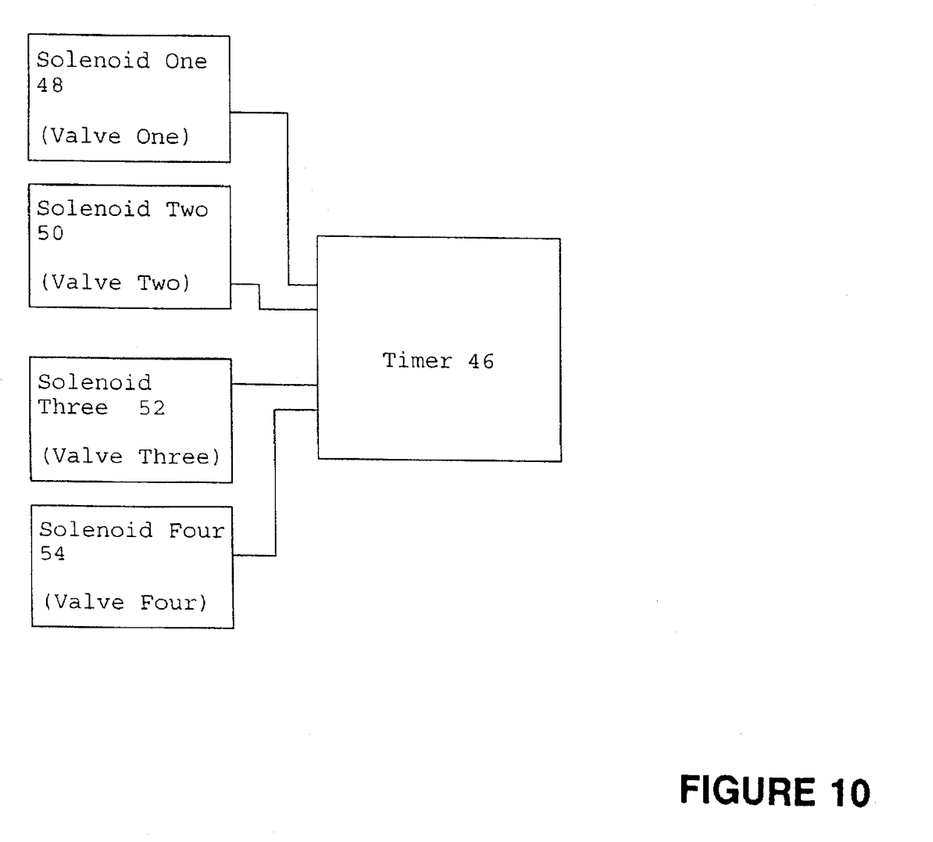
FIG. 10 is a block diagram of an alternative automatic control for the system.

When one drying radial adsorber bed is saturated with moisture, the beds are switched. This process may be operated manually or automatically. In the automatic mode, this process can be achieved through programming, which takes into account the physical characteristics of the desiccant bed relative to lapse time via the timing unit 46 which is operably associated with the CPU 42. The beds 30, 36 are switched on a fixed time cycle. The saturation level that the bed reaches during this timed drying cycle is precalculated for the individual dynamic desiccant capacity that is recommended by the desiccant manufacturer. However, a similar result can be achieved by installing sensors 56, 58, FIG. 9, in desiccant beds 30, 36. Then when the operational desiccant bed 30 reaches saturation, sensor 56, FIG. 4, sends a signal to the CPU 42 which can automatically switch the desiccant beds, FIG. 9a, so that regeneration of the saturated bed 30 commences. Thus, valve one 22 would open and valve three 28 would close. The bed 36 that was regenerating now becomes the operational drying radial adsorber bed. This sophisticated system would employ a CPU 42 and program 44 which would continuously monitor the sensors, 56, 58, and send the appropriate signals to the solenoids 48, 50, 52, 54 to open and close the appropriate valves, a default timer 47 may be added to the CPU so that the system would still operate even if there is a failure in one of the sensors.

One of ordinary skill will readily recognize that this control system can be done electronically without a CPU or operating programming, FIG. 1, with solenoids operably connected to a timer device or with solenoids operably connected to the sensors. It is also noted that while the valves are controlled by solenoids, that the system could also use solenoid valves, or another control device for the automatic electronic control of the valve means.

The regeneration cycle consists of extracting atmospheric air through an air filter 12 into an air blower 14 and blowing this air through a heater 18 to generate warm or hot purge air. Then, this purge air utilizes thermal energy to remove the water from the pores of the desiccant. In most cases in order to optimize the regeneration of the desiccant bed it is necessary to regulate or optimize the flow of the regenerative air. This can be accomplished by a thermostatically controlled damper or by connecting a rheostat or potentiometer to the blower to regulate its speed.

In the fully automatic mode, this system will include all necessary controls, valves, heaters and blower to support the drying function of the radial adsorber desiccant beds.

Figure 2:
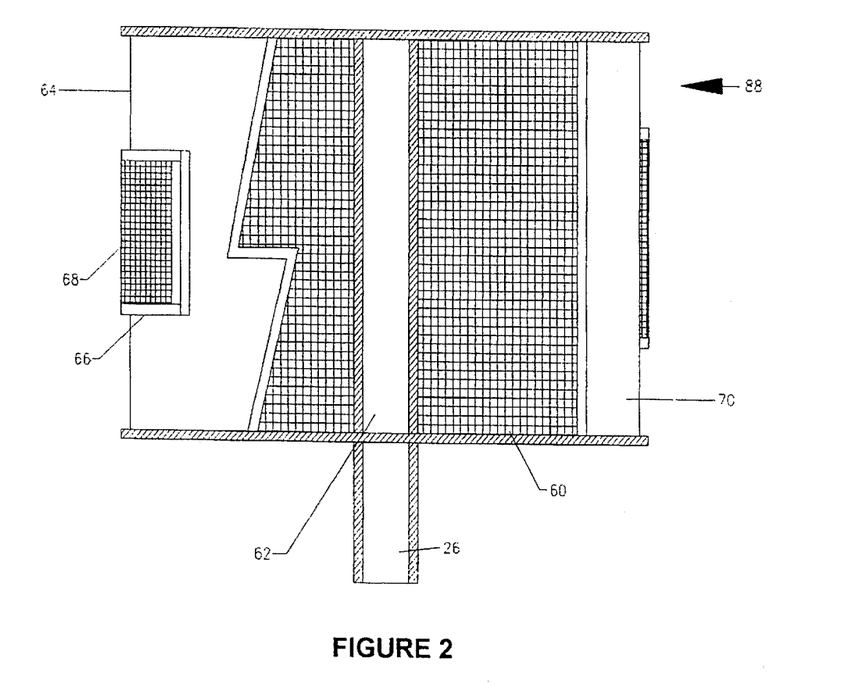
FIG. 2 is a cross sectional view of a radial adsorber desiccant bed.

In the preferred embodiment of this invention, the absorptive desiccant bed media 60, FIG. 2, is configured as a continuous radius about a core member 62. The radial bed configuration is integral to the performance of this dryer as it creates increased surface area for the air flow. Increased surface area also increases the contact time which the air experiences as it flows through the desiccant bed. Any water vapor that is entrained by the air flow is adsorbed by the desiccant media 60. The geometric shape of the radial bed adsorber allows this system to achieve a minimum 2 second air flow contact time as it flows in a radial direction through the desiccant bed. Thus, the dewpoint of the air is reduced before it enters the inlet of a compression machine. The obtainable dewpoints produced by this dryer will result in dewpoints at pressure after compression which meet or exceed the capabilities of current compressed air drying equipment.

The radial desiccant media is preferably housed in a cylindrical vessel 64 which includes at least one air induction port 66 fitted with a flow vent filter 68. This air induction port can be placed either in the side, top or bottom of the cylindrical vessel, and preferably in a gap zone 70. Gap zone 70 is an area between the side of the cylindrical vessel 64 and the desiccant media 60 which allows free air flow all about the cylindrical shaped desiccant media 60.

The desiccant media 60 can be selected from, but is not limited to, the group comprising activated aluminum trioxide ($Al_2O_3$), molecular sieve, silica gel, lithium chloride (LiCl) and combinations thereof. An example of possible combinations is a aluminum trioxide and silica gel desiccant media sold under the trademark SORBEAD™, which can be obtain from a variety of manufacturers including the Mobil Chemical Company.

The desiccant media adsorbs moisture which results in dry intake air to a compression machine from an outside to inside flow direction through a desiccant bed or beds with a radial geometric shape.

If this invention is applied as a replacement for instrument air dryers, then the purge air which is required to regenerate such dryers is eliminated. Since this purge air is compressed air, the brake-horsepower energy required to produce the purge air is saved. By pre-drying the atmospheric air before compression, the need for condensate removal and collection equipment is eliminated. This condensate is currently an environmental concern as the condensate is contaminated with air compressor oil when lubricated air compressors are involved. The savings experienced includes the cost of such equipment, the cost of proper disposal of the condensate and the cost of compressed air lost through drains associated with this equipment.

Because this invention operates under atmospheric pressure, potentially dangerous pressurized air drying components are no longer present in the compressed air system. Overall, this invention provides a more economical and efficient way of producing compressed air which is supplied to machines and equipment which require dry compressed air in order to operate.

ALTERNATIVE EMBODIMENTS

While a cylindrical desiccant bed configured for radial air flow, FIG. 2, is preferable, this same system will work with any shape desiccant bed media, preferably of a tubular configuration, as well as with a desiccant bed configured for axial air flow. Unlike the prior art, these axial air desiccant beds need not be housed in a pressure vessel as this system operates at atmospheric pressure. Note, the preferred cylindrical vessel 64 need not be a pressure vessel as it operates at atmospheric pressure.

In the rejuvenation cycle, moisture is forced out of the desiccant media 60 which would tend to soak the flow vent filter 68. Therefore, cylindrical vessel 64 is preferably fitted with an exhaust port 72 complete with exhaust door 74. Similarly, an adsorption door (inlet door) or shield 76 can be placed on the inside of the cylindrical vessel 64 to prevent the moisture from the desiccant media 60 from migrating through the flow vent filter. Exhaust door 74 and adsorption door 76 can be either mounted on hinges or electronically controlled, FIG. 5. In a manual mode compression machine 39, FIG. 1, draws air through desiccant bed 30, and adsorption door 76 is pulled open by the negative pressure. This negative pressure also pulls exhaust door 74 closed. In the regeneration mode, air from blower 14 is channeled into desiccant bed 36 and the positive air flow closes adsorption door 76 and opens exhaust door 74 which allows the warm moist air to exit the unit unencumbered by flow vent filter 68. These doors may also be configured without hinges as a slide vent which is manually controlled by an operator.

Figure 5:
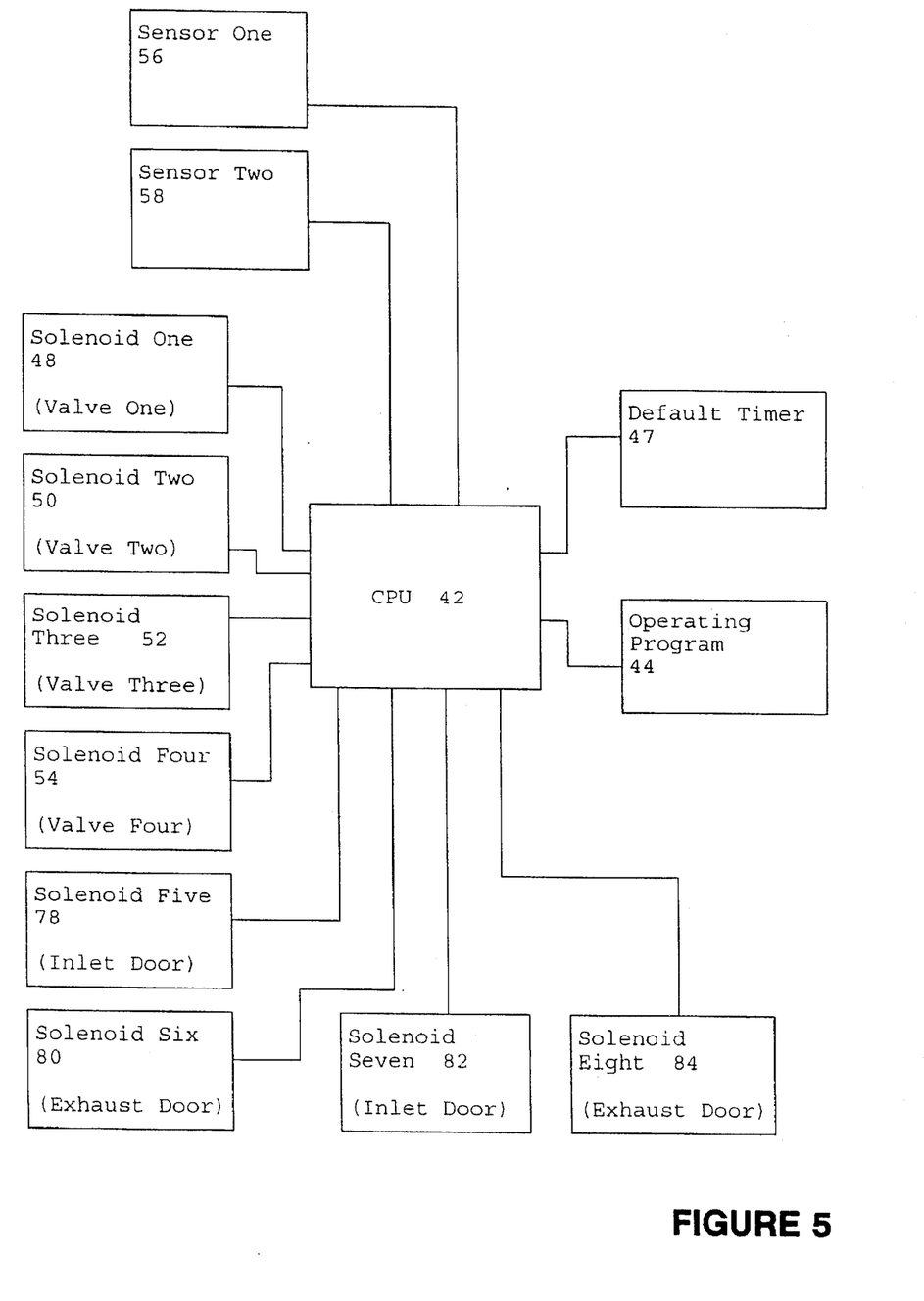
FIG. 5 is a block diagram of another alternative embodiment of an automatic control for the system.
Figure 6:
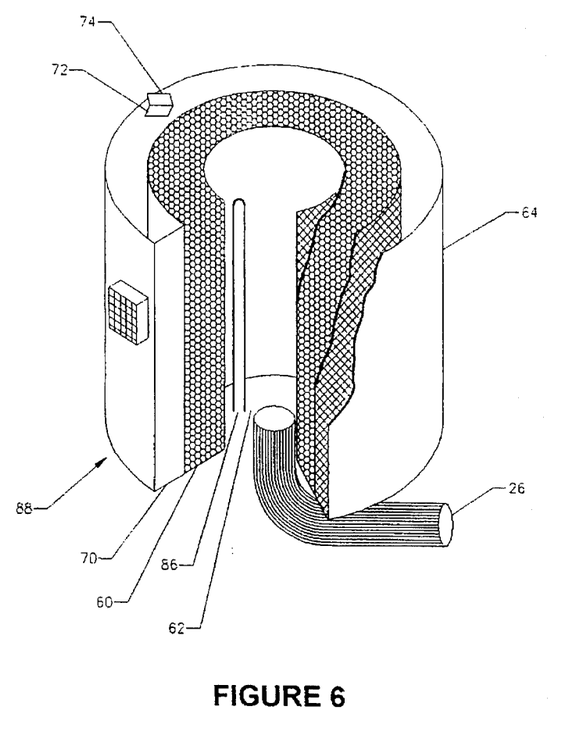
FIG. 6 is a cross sectional view of a radial adsorber desiccant bed.
Figure 6A:
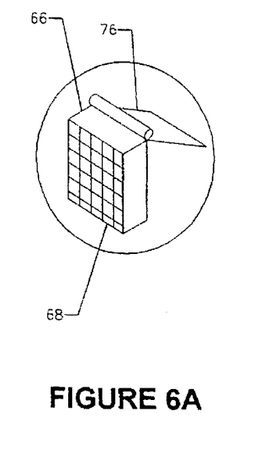
FIG. 6a is an enlarged view of the inlet door of the radial adsorber desiccant bed of claim 6.

In operation, the adsorption door 76 is open in the adsorption phase of the desiccant bed 30, while the exhaust door 74 is closed. When the desiccant bed 36 is in the rejuvenation mode, FIG. 1, the adsorption door 76 is closed and the exhaust door 74 is open. This process can be done either manually or automatically. In the automatic mode, solenoids five, six, seven and eight, 78, 80, 82, 84, FIG. 5 are added to CPU 42. The operation of these doors are controlled either by sensors 56, 58, the operating program 44, or the operating program 44 in communication with the sensors 56, 58.

Figure 7:
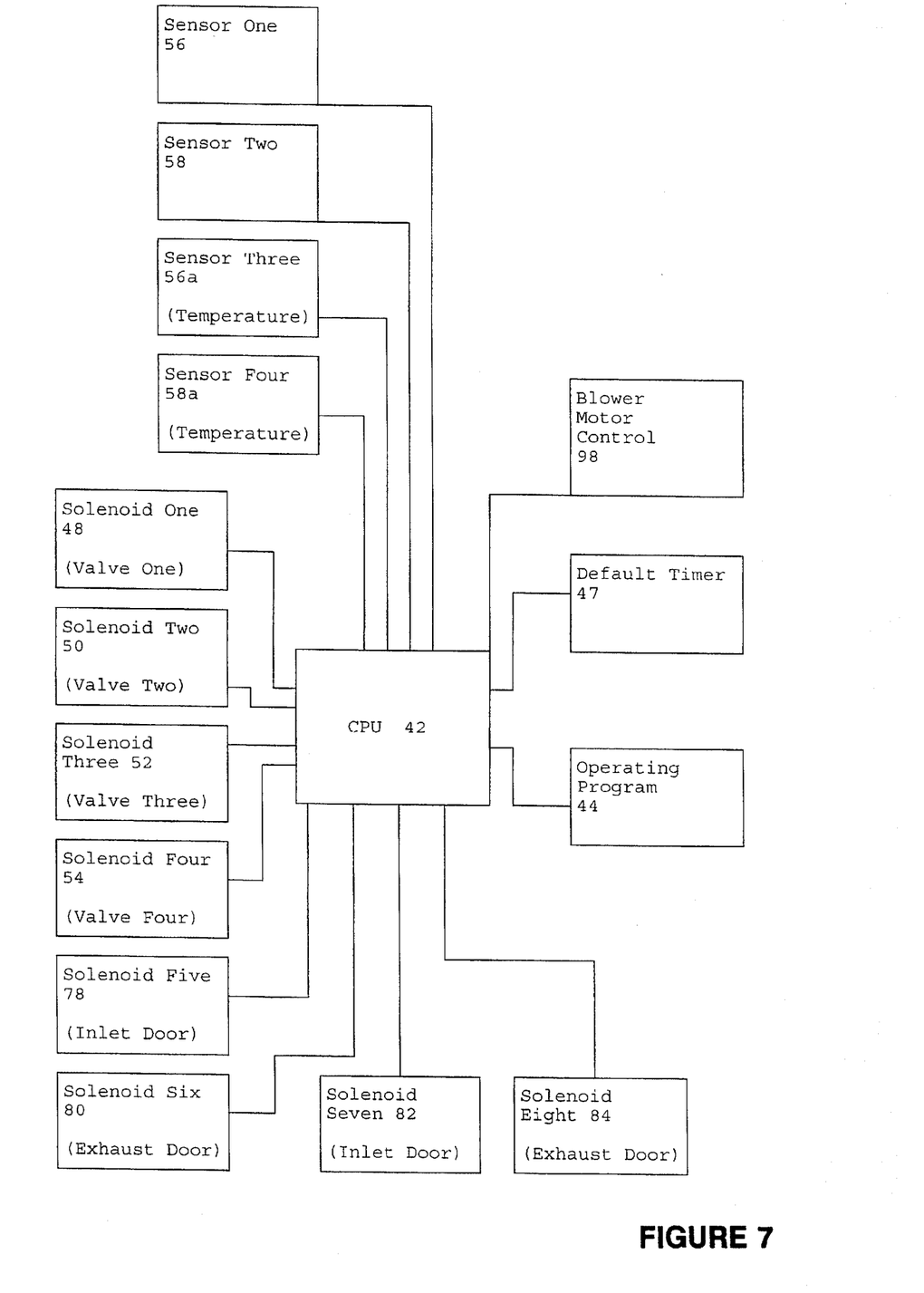
FIG. 7 is a block diagram of another alternative embodiment of an automatic control for the system which includes automatic controls for the regeneration cycle.

The control of the regeneration of the desiccant bed can also be automatically controlled by connecting a blower motor control 98, FIG. 7, to the CPU 42. The blower motor control can be made up of a linear actuator, operably associated with the CPU 42 and to a rheostat. Servo mechanism is also connected to the CPU 42 and the rheostat. Rheostat is connected to blower 14. In operation, information from one of the sensor means is sent to CPU 42 and operating program 44 where values are compared and instructions are given to CPU 42 which controls linear actuator 92 which in turn controls blower 14 through rheostat. Servo mechanism 96 sends information back to the CPU regarding the linear actuator's operation. Additional sensors 56a, 58a may be added to monitor temperature of each bed this input can be connected to the CPU to facilitate proper control of blower 14.

It is also possible to configure each radial desiccant bed unit 88 with an integral heating unit 86 placed at the core 62 of the radial desiccant bed unit 88. An example of the type of suitable heating unit is a CHROMALOX® heater manufactured by Chromalox-E. L. Wiegand Division, Emerson Electric Co., 641 Alpha Dr., Pittsburgh Pa. 15238. When the radial desiccant bed 88 utilizes an integral heating unit 86, a single blower 14 can be employed or separate blowers can be used for each unit.

Alternatively the heating unit can comprise steam coils or any other source of warm or hot air. For example, a heat exchanger which uses waste exhaust heat can provide a low cost primary or supplemental source of heat.

Figure 8:
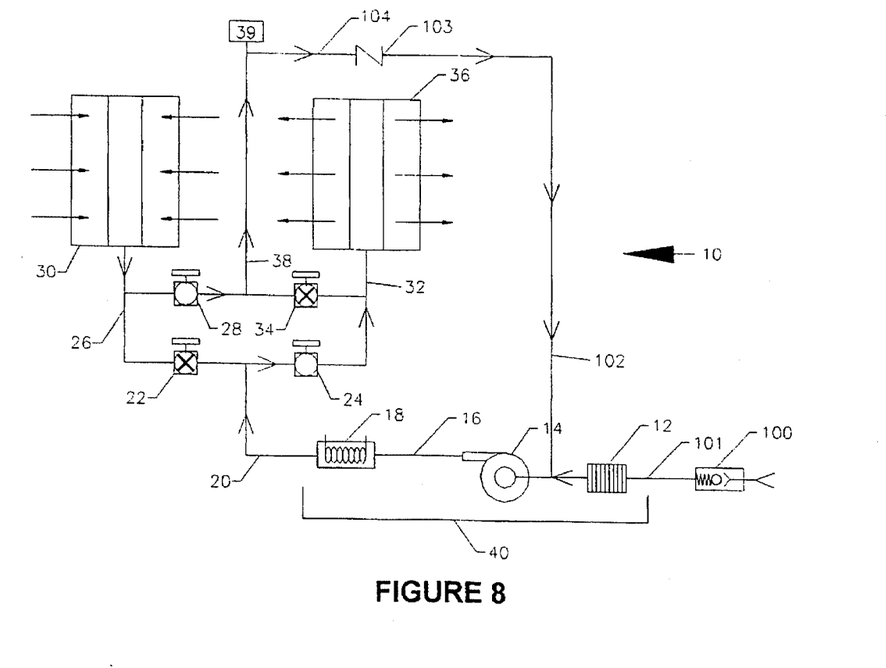
FIG. 8 is a schematic diagram of an alternative embodiment of the present invention.

The regeneration gas source can also be from the effluent dry air stream produced by the adsorber vessel in the drying sequence of operation, FIG. 8. By using a dried supply of air for regeneration, the dryer can obtain lower dewpoints and be regenerated at lower temperatures to save energy and increase the life of desiccant by reducing thermal attrition. Also, the adsorber vessel may be cooled to temperatures approaching ambient conditions before the vessel is sequenced into the absorption cycle. By cooling the desiccant with dried air, the desiccant is not preloaded with atmospheric moisture before switchover, thus increasing its absorptive capacity.

From FIG. 8, during the heating cycle the dried air is drawn by the blower 14 through conduit 104 which leads to a suction door 103. This door prevents the compressor suction from overcoming the blower suction and reversing air flow through the blower in the event of an excessive static pressure buildup in the adsorbing tower. The air then flows through conduit 102 to the intake of the blower 14, where it enters into the regeneration system 40 to be heated. During the cool down cycle, the dried air is drawn by the blower 14, through conduit 104 which leads to a suction door 103. The air then proceeds through conduit 102 to the intake of the blower 14, where it enters into the regeneration system. During this portion of regeneration, the heater is turned off so the air may cool down the desiccant. In the event that the suction door 103 is closed off by an excessive static pressure buildup on the compressor/drying adsorber side, the spring operated check valve 100 will open allowing the blower to draw in atmospheric air through conduit 101 so as not to starve the regeneration blower 14.

Note, that while the term adsorption is used throughout this application, said desiccant media could also be described as absorbing excess moisture.

SUMMARY OF THE ACHIEVEMENT OF THE OBJECTS OF THE INVENTION

From the foregoing, it is readily apparent that we have invented an improved method of drying atmospheric air before it enters into an air compressing machine which eliminates the need for aftercoolers, moisture separators, compressed air dryers and oil/water separators. Further, we have provided an apparatus for lowering the dewpoint of the atmospheric air so that after compression, the dewpoint of the air will meet or exceed the drying capabilities of current compressed air drying systems. This apparatus also reduces the pressure drops that occur through compressed air drying systems and saves energy as well as the capital costs of the compressed air drying equipment. The apparatus increases the efficiency of the compressor, which translates into further energy savings. The invented apparatus also eliminates the potential for moisture condensation in the oil of lubricated air compressors, which increases the life of the compressor and reduces the cost of maintenance. By eliminating pressure vessels which contain the desiccant filters, this apparatus also is lower in cost. Environmentally, this apparatus eliminates the use of a refrigerated compressed air dryer, which also eliminates the presence of chlorofluorocarbon refrigerants which damage the earth's ozone layer.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method of drying atmospheric air prior to compression and regenerating spent desiccant media, comprising the steps of:

providing a first pre-compression tubular desiccant bed adsorption unit adapted for radial air flow therethrough and a second pre-compression tubular desiccant bed adsorption unit having radial flow;

drawing atmospheric air through one of the pre-compression desiccant bed absorption units radially;

conveying dried air from said pre-compression tubular desiccant bed adsorption unit to an inlet of a gas compression machine;

regenerating the other pre-compression desiccant bed adsorption unit by;

generating heated atmospheric air;

conveying heated atmospheric air through the other pre-compression desiccant bed adsorption unit;

drying said other pre-compression desiccant bed with the heated air radially.

2. A method of drying atmospheric air prior to processing and regenerating spent desiccant media, according to claim 1, further comprising the steps of:

providing sensor means in said first desiccant bed adsorption unit and said second desiccant bed adsorption unit;

providing electronic means for controlling an adsorption and a regeneration phase for each desiccant bed;

monitoring saturation level of said desiccant bed in the adsorption phase;

determining when a predetermined saturation level is reached;

switching the saturated bed to said regeneration phase.

3. A method of drying atmospheric air prior to processing and regenerating spent desiccant media, according to claim 2, further comprising the steps of:

providing separate exhaust and intake means for each desiccant bed;

providing electronic means for controlling access to the exhaust and intake means;

opening said intake means when the desiccant bed is in the adsorption phase;

closing said exhaust means when the desiccant bed is in the adsorption phase;

opening said exhaust means when the desiccant bed is in the regeneration phase; and closing said intake means when the desiccant bed is in the regeneration phase.

4. A pre-compression gas-dehydration system, comprising:

a pre-compression blower;

a pre-compression heater connected and communicating with said pre-compression blower;

a first pre-compression valve and a second pre-compression valve communicating with said heater;

a first substantially atmospheric pre-compression desiccant bed adsorption unit in communication with said first pre-compression valve;

a second substantially atmospheric pre-compression desiccant bed adsorption unit in communication with said second pre-compression valve;

a dried atmospheric gas discharge conduit in communication with said first pre-compression valve and said second pre-compression valve, communicating dried atmospheric gas having a lowered dew point with an inlet of a gas compression machine.

5. A pre-compression dehydration system according to claim 4, further comprising an air filter fixably attached and communicating with said blower.

6. A pre-compression dehydration system according to claim 4, wherein said desiccant bed adsorption units are adapted for pre-compression axial flow of air therethrough.

7. The pre-compression dehydration system according to claim 4, wherein said first and second pre-compression desiccant bed adsorption units each further comprise:

a tubular pre-compression desiccant bed, having a top, a bottom, a continuous side, and defining a tubular center channel;

said tubular pre-compression desiccant bed being filled with a desiccant media;

a tubular pre-compression container, having a top, a bottom, a continuous side, said top and bottom of said tubular container contacting said top and bottom of said tubular desiccant bed and said tubular container's continuous side being spaced apart from said continuous side of said tubular desiccant bed; and an air filter integral with said tubular container.

8. The pre-compression dehydration system according to claim 7, wherein said air filter is integral with said continuous side of said tubular container.

9. The pre-compression dehydration system according to claim 8, wherein said tubular container is cylindrical.

10. The pre-compression dehydration system according to claim 7, said first and second desiccant bed adsorption unit further comprising:

a protective door for said air filter; and a exhaust door in said tubular container;

wherein said air filter can be covered and said exhaust door can be opened to facilitate regeneration of said desiccant media.

11. The pre-compression dehydration system according to claim 7, wherein said desiccant bed media is selected from the group consisting of activated aluminum trioxide ($Al_2O_3$), molecular sieve, silica gel, lithium chloride (LiCl) and combinations thereof.

12. The pre-compression dehydration system according to claim 7, further comprising a means for controlling operations of said first valve and said second valve.

13. The pre-compression dehydration system according to claim 12, wherein said means for controlling operations of said first valve and said second valve further comprises:

a first solenoid operably associated with said first valve;

a second solenoid operably associated with said second valve; and a timing unit operably associated with said first and second solenoids.

14. The pre-compression dehydration system according to claim 12, further comprising:

a first solenoid operably associated with said first valve;

a second solenoid operably associated with said second valve;

a first sensor unit operably associated with said first desiccant bed adsorption unit, and said first solenoid;

a second sensor unit operably associated with said second desiccant bed adsorption unit, and said second solenoid.

15. The pre-compression dehydration system according to claim 14, wherein said sensors are moisture sensors.

16. The pre-compression dehydration system according to claim 14, wherein said sensors are temperature sensors.

17. The pre-compression dehydration system according to claim 14, wherein said blower operates at a speed and further comprising means for controlling said speed of said blower.

18. The pre-compression dehydration system according to claim 17, wherein said means for controlling said speed of said blower, further comprises:

a linear actuator operably associated with said first and second sensor units;

a servo mechanism operably associated with said linear actuator; and a rheostat operably associated with said linear actuator and said blower.

19. The pre-compression dehydration system according to claim 12, further comprising:

a first solenoid operably associated with said first valve;

a second solenoid operably associated with said second valve;

a first sensor unit operably associated with said first desiccant bed adsorption unit, and said first solenoid;

a second sensor unit operably associated with said second desiccant bed adsorption unit, and said second solenoid;

a first means for operating a protective door operably associated with said first and second sensor units and said protective door on said first desiccant bed adsorption unit;

a second means for operating said protective door operably associated with said first and second sensor units and said protective door on said second desiccant bed adsorption unit;

a first means for operating an exhaust door operably associated with said first and second sensor units and said exhaust door on said first desiccant bed adsorption unit;

a second means for operating an exhaust door operably associated with said first and second sensor units and said exhaust door on said second desiccant bed adsorption unit;

wherein said air filters can be covered and said exhaust door can be opened to facilitate regeneration of said desiccant media.

20. A pre-compression gas-dehydration system, comprising:

a blower;

a heater connected and communicating with said blower;

a first valve and a second valve communicating with said heater;

a first desiccant bed adsorption unit in communication with said first valve;

a second desiccant bed adsorption unit in communication with said second valve;

a first conduit in communication with said first valve and said second valve, communicating with a gas compression machine;

a second conduit communicating with said first conduit;

a suction door in communication with said second conduit;

a third conduit in communication with said suction door and said blower; and an operating check valve in communication with said blower.

21. A pre-compression dehydration system according to claim 20, further comprising an air filter fixably attached and communicating with said blower.

22. A pre-compression dehydration system according to claim 20, wherein said desiccant bed adsorption units are adapted for axial flow of air therethrough.

23. The pre-compression dehydration system according to claim 20, wherein said first and second desiccant bed adsorption units each further comprise:

a tubular desiccant bed having a top, a bottom, a continuous side, and defining a tubular center channel;

said tubular desiccant bed being filled with a desiccant media;

a tubular container, having a top, a bottom, a continuous side, said top and bottom of said tubular container contacting said top and bottom of said tubular desiccant bed media and said tubular container's continuous side being spaced apart from said continuous side of said tubular desiccant bed media; and an air filter integral with said tubular container.

24. The pre-compression dehydration system according to claim 23, wherein said air filter is integral with said continuous side of said tubular container.

25. The pre-compression dehydration system according to claim 23, wherein said tubular container is cylindrical.

26. The pre-compression dehydration system according to claim 23, said first and second desiccant bed adsorption unit further comprising:

a protective door for said air filter; and a exhaust door in said tubular container;

wherein said air filter can be covered and said exhaust door can be opened to facilitate regeneration of said desiccant media.

27. The pre-compression dehydration system according to claim 23, wherein said desiccant bed media is selected from the group consisting of activated aluminum trioxide ($Al_2O_3$), molecular sieve, silica gel, lithium chloride (LiCl) and combinations thereof.

28. The pre-compression dehydration system according to claim 20, further comprising a means for controlling operations of said first valve and said second valve.

29. The pre-compression dehydration system according to claim 28, wherein said means for controlling operations of said first valve and said second valve further comprises:

a first solenoid operably associated with said first valve;

a second solenoid operably associated with said second valve; and a timing unit operably associated with said first and second solenoids.

30. The pre-compression dehydration system according to claim 28, further comprising:

a first solenoid operably associated with said first valve;

a second solenoid operably associated with said second valve;

a first sensor unit operably associated with said first desiccant bed adsorption unit, and said first solenoid;

a second sensor unit operably associated with said second desiccant bed adsorption unit, and said second solenoid.

31. The pre-compression dehydration system according to claim 30, wherein said sensors are moisture sensors.

32. The pre-compression dehydration system according to claim 30, wherein said sensors are temperature sensors.

33. The pre-compression dehydration system according to claim 30, wherein said blower operates at a speed and further comprising means for controlling said speed of said blower.

34. The pre-compression dehydration system according to claim 33, wherein said means for controlling said speed of said blower, further comprises:

a linear actuator operably associated with said first and second sensor units;

a servo mechanism operably associated with said linear actuator; and a rheostat operably associated with said linear actuator and said blower.

35. The pre-compression dehydration system according to claim 28, further comprising:

a first solenoid operably associated with said first valve;

a second solenoid operably associated with said second valve; a first sensor unit operably associated with said first desiccant bed adsorption unit, and said first solenoid;

a second sensor unit operably associated with said second desiccant bed adsorption unit, and said second solenoid;

a first means for operating a protective door operably associated with said first and second sensor units and said protective door on said first desiccant bed adsorption unit;

a second means for operating said protective door operably associated with said first and second sensor units and said protective door on said second desiccant bed adsorption unit;

a first means for operating an exhaust door operably associated with said first and second sensor units and said exhaust door on said first desiccant bed adsorption unit;

a second means for operating an exhaust door operably associated with said first and second sensor units and said exhaust door on said second desiccant bed adsorption unit;

wherein said air filters can be covered and said exhaust door can be opened to facilitate regeneration of said desiccant media.

36. A pre-compression air dehydration system, comprising:

a pre-compression air filter;

a pre-compression blower fixably attached and communicating with said pre-compression air filter;

a first pre-compression conduit connected and communicating with said pre-compression blower;

a pre-compression heater connected and communicating with said pre-compression first conduit;

a second pre-compression conduit communicating with said pre-compression heater;

a first pre-compression valve and a second pre-compression valve communicating with said second pre-compression conduit;

a third pre-compression conduit in communication with said first pre-compression valve;

a first substantially atmospheric pre-compression desiccant bed adsorption unit in communication with said third pre-compression conduit;

a third pre-compression valve in communication with said third pre-compression conduit;

a fourth pre-compression conduit in communication with said second pre-compression valve;

a second substantially atmospheric pre-compression desiccant bed adsorption unit in communication with said fourth pre-compression conduit;

a fourth pre-compression valve in communication with said fourth pre-compression conduit;

a fifth dried atmospheric air discharge conduit in communication with said third pre-compression valve and said forth pre-compression valve and leading dried atmospheric air having a lowered dew point to an inlet of an air compression machine.

37. The pre-compression dehydration system according to claim 18, wherein each of said first and second substantially atmospheric pre-compression desiccant bed adsorption units further comprises:

a pre-compression tubular desiccant bed, having a top, a bottom, a continuous side, and defining a tubular center channel;

said tubular pre-compression desiccant bed being filled with a desiccant media;

a pre-compression tubular container, having a top, a bottom, a continuous side, said top and bottom of said tubular container contacting said top and bottom of said tubular desiccant bed and said continuous side of said tubular container being spaced apart from said continuous side of said tubular desiccant bed;

a pre-compression air filter integral with said tubular container.

38. The pre-compression dehydration system according to claim 37, where said air filter is integral with said continuous side of said tubular container.

39. The pre-compression dehydration system according to claim 37, where said tubular container is cylindrical.

40. The pre-compression dehydration system according to claim 37, wherein said first and second desiccant bed adsorption unit further comprises:

a protective door for said air filter; and a exhaust door in said tubular container;

wherein said air filter can be covered and said exhaust door can be opened to facilitate regeneration of said desiccant media.

41. The pre-compression dehydration system according to claim 37, wherein said desiccant bed media is selected from the group consisting of activated aluminum trioxide ($Al_2O_3$), molecular sieve, silica gel, lithium chloride (LiCl) and combinations thereof.

42. The pre-compression dehydration system according to claim 36, further comprising a means for controlling operations of said first valve and said second valve, said third valve and said fourth valve.

43. The pre-compression dehydration system according to claim 42, wherein said means for controlling operations of said first valve and said second valve further comprises:

a first solenoid operably associated with said first valve;

a second solenoid operably associated with said second valve; and a timing unit operably associated with said first and second solenoids.

44. The pre-compression dehydration system according to claim 42, further comprising:

a first solenoid operably associated with said first valve;

a second solenoid operably associated with said second valve;

a first sensor unit operably associated with said first desiccant bed adsorption unit, and said first solenoid;

a second sensor unit operably associated with said second desiccant bed adsorption unit, and said second solenoid.

45. The pre-compression dehydration system according to claim 44, wherein said sensors are moisture sensors.

46. The pre-compression dehydration system according to claim 44, wherein said sensors are temperature sensors.

47. The pre-compression dehydration system according to claim 36, further comprising:

a first solenoid operably associated with said first valve;

a second solenoid operably associated with said second valve;

a first sensor unit operably associated with said first desiccant bed adsorption unit, and said first solenoid;

a second sensor unit operably associated with said second desiccant bed adsorption unit, and said second solenoid;

a first means for operating a protective door operably associated with said first and second sensor units and said protective door on said first desiccant bed adsorption unit;

a second means for operating said protective door operably associated with said first and second sensor units and said protective door on said second desiccant bed adsorption unit;

a first means for operating an exhaust door operably associated with said first and second sensor units and said exhaust door on said first desiccant bed adsorption unit;

a second means for operating an exhaust door operably associated with said first and second sensor units and said exhaust door on said second desiccant bed adsorption unit;

wherein said air filters can be covered and said exhaust door can be opened to facilitate regeneration of said desiccant media.

48. The pre-compression dehydration system according to claim 36, wherein said blower operates at a speed and further comprising means for controlling said speed of said blower.

49. The pre-compression dehydration system according to claim 48, wherein said means for controlling said speed of said blower, further comprises:

a linear actuator operably associated to said first and second sensor units;

a servo mechanism operably associated to said linear actuator; and a rheostat operably associated to said linear actuator and said blower.

50. The pre-compression dehydration system according to claim 36, further comprising:

a sixth conduit communicating with said fifth conduit;

a suction door in communication with said sixth conduit;

a seventh conduit in communication with said suction door and said blower; and a operating check valve in communication with said air filter.

51. A radial desiccant bed adsorption unit, comprising:

a tubular pre-compression desiccant bed, having a top, a bottom, a continuous side, and defining a tubular center channel;

said tubular pre-compression desiccant bed being filled with a desiccant media;

a tubular substantially atmospheric pre-compression container, having a top, a bottom, a continuous side, said tubular container's top and bottom contacting said top and bottom of said tubular desiccant bed and said tubular container's continuous side being spaced apart from said tubular desiccant bed's continuous side;

means for causing radial atmospheric air flow through said tubular pre-compression desiccant bed comprising a compression machine in communication with said radial desiccant bed adsorption unit drawing air from said tubular center channel causing a negative pressure and drawing air from all sides of said tubular pre-compression bed; and a pre-compression air filter integral with said tubular substantially atmospheric pre-compression container.

52. A pre-compression radial desiccant bed adsorption unit according to claim 51, further comprising a heating unit located in said tubular center channel of said tubular desiccant bed.

53. A pre-compression radial desiccant bed adsorption unit according to claim 51, where said tubular desiccant bed is cylindrical.

* * * * *